March 26, 1968

B. M. GRANT 3,374,611

AGRICULTURAL COMBINES

Filed Dec. 4, 1964

INVENTOR.
BENJAMIN M. GRANT

BY Browne, Schuyler, & Beveridge

ATTORNEYS.

INVENTOR.
BENJAMIN M. GRANT

BY ATTORNEYS.

March 26, 1968  B. M. GRANT  3,374,611
AGRICULTURAL COMBINES
Filed Dec. 4, 1964  4 Sheets-Sheet 4
FIG. 5
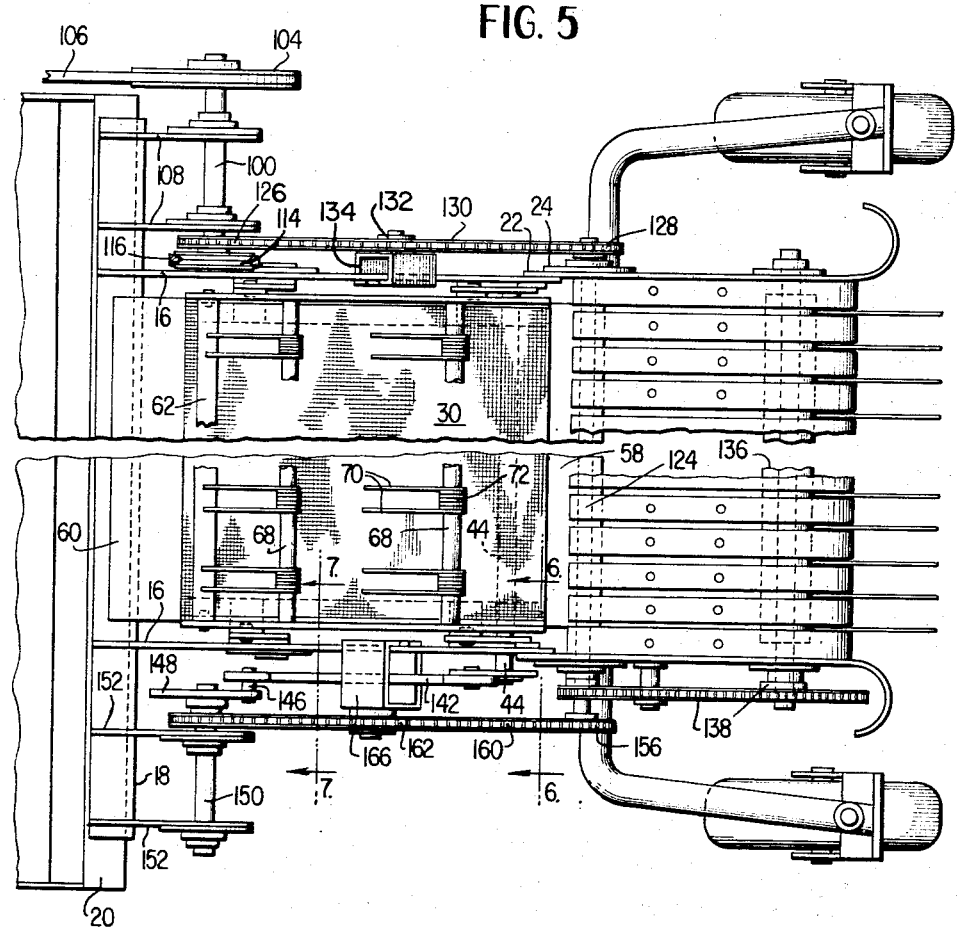
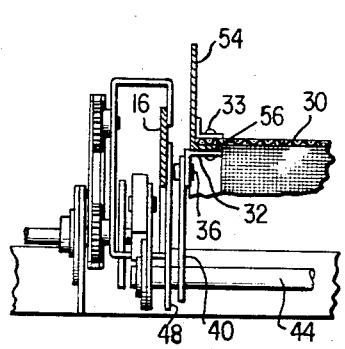
FIG. 6
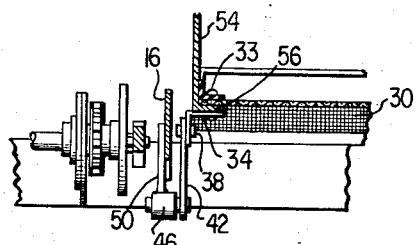
FIG. 7
INVENTOR.
BENJAMIN M. GRANT
BY
ATTORNEYS.

United States Patent Office 3,374,611
Patented Mar. 26, 1968

3,374,611
AGRICULTURAL COMBINES
Benjamin M. Grant, Rte. 1, Box 43,
Pasco, Wash. 99301
Filed Dec. 4, 1964, Ser. No. 416,082
10 Claims. (Cl. 56—27)

ABSTRACT OF THE DISCLOSURE

A shaker mechanism for separating rocks and clods of dirt from harvested crops after pickup and before thrashing in a combine. The shaker mechanism includes a screen inclined downwardly towards the thrasher, a plurality of resilient fingers overlying the screen to support the harvested crop above the screen, a vibrating device for vibrating the screen together with the spring fingers, and a horizontal bar positioned across the screen at the thrasher end for preventing large rocks from passing to the thrasher. Preferably a rotatable reel is placed above the screen for advancing crop over the screen to the thrasher.

---

This invention generally relates to combines for harvesting and thrashing crops such as beans, for example, and more particularly this invention relates to a novel device hereinafter termed "shaker mechanism" to be used with a combine for separating rocks and clods of dirt from harvested crop before thrashing.

In conventional combines of the aforedescribed type, windrows or severed crops are gathered from the field by a pick-up mechanism which directly conveys the crop to the auger in the header of the combine for subsequent thrashing. With this arrangement, rocks, clods of dirt, sand, and the like are often conveyed with the harvested crop into the thrashing mechanism where serious damage has been known to result.

Accordingly, it is an object of the present invention to provide an improved combine in which substantial amounts of rocks and dirt are removed from the harvested crop prior to thrashing in the combine. Included in this object is the provision of such a combine in which the thrashing mechanism will experience a prolonged service life of increased efficiency and effectiveness.

A more specific object of this invention is to provide a shaker mechanism between the pick-up and thrashing mechanism of a combine for separating rocks and clods of dirt from the gathered crop as the latter is conveyed to the thrashing mechanism.

A further object of the present invention is to provide such a shaker mechanism which may be economically manufactured and incorporated into new or existing combines as an attachment and will provide effective service over long periods of repeated and rugged use.

Other objects and advantages of the present invention will become apparent from the following description taken in conjunction with the associated drawings in which:

FIG. 5 is a plan view of the combine taken generally along lines 5—5 of FIG. 4;

FIG. 6 is a fragmental cross-sectional view taken generally along lines 6—6 of FIG. 5; and FIG. 7 is a fragmental cross-sectional view taken generally along lines 7—7 of FIG. 5.

Figure 1:
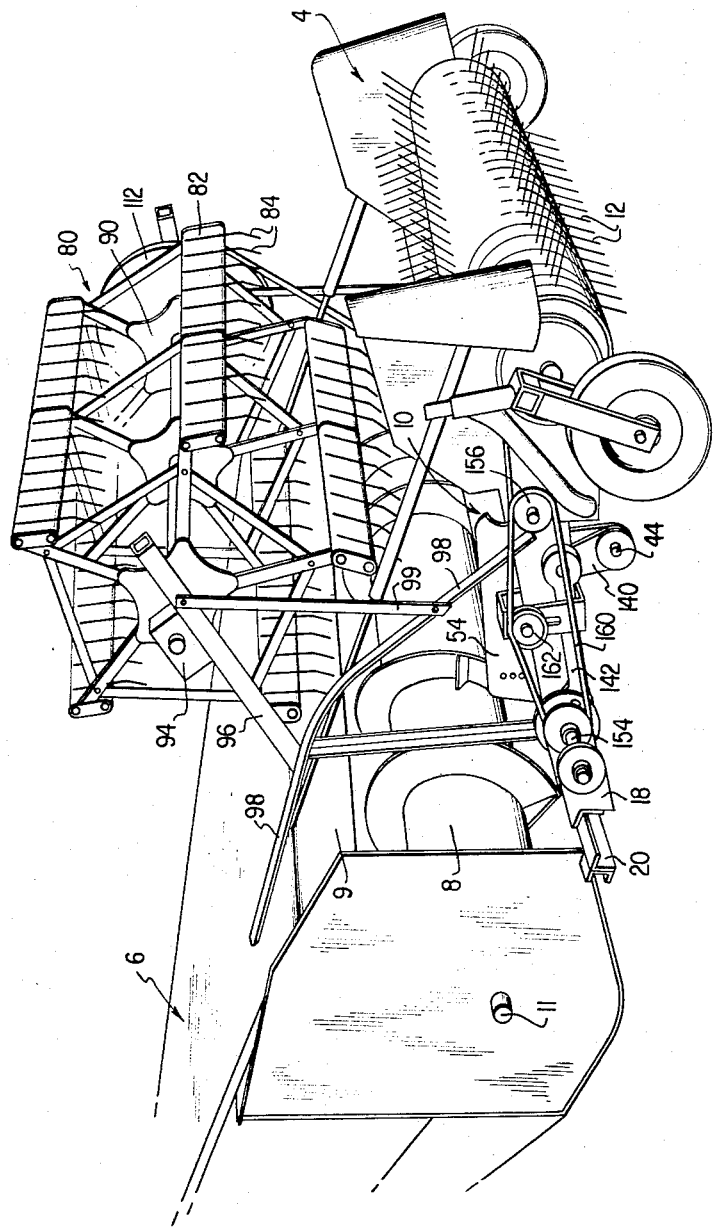
FIG. 1 is a perspective view of part of a combine embodying the present invention.

Referring to the drawings in detail, in FIG. 1 there is illustrated a combine embodying the present invention including a conventional pick-up mechanism generally designated 4 which gathers the windrow or crop, a conventional thrashing mechanism generally designated 6 including an auger 8 for separating the grain or beans from the crop, and a shaker mechanism 10 positioned between pick-up mechanism 4 and the thrashing mechanism 6 in accordance with the present invention. Pick-up mechanism 4 has radial fingers 12 which are rotatable to pick up windrows from the field in the usual manner while auger 8 is typically situated in the header 9 of the combine so as to convey gathered crop or windrow to thrashing mechanism 6.

In the illustrated embodiment, shaker mechanism 10 includes a frame comprised of a pair of side plates 16 interconnected at one end by a channeled rear piece 18 which is bolted onto the flange 20 fixed across the lower portion of header 9. Opposite ends 22 of frame side plates 16 are bolted to the side walls 24 of pick-up mechanism 4 at the discharge end of the latter which is located above header flange 20 so that the shaker frame extends downwardly at an oblique angle from pick-up mechanism 4 to combine header 9.

Between side walls 16 of the shaker frame, there is a perforated planar member shown as a screen 30 extending at the same angle as the frame under the path of movement of the crop from the pick-up mechanism to the auger as will subsequently be described in greater detail. Screen 30 is mounted for vibration in horizontal and vertical directions to cause rocks, clods of dirt, loose foliage, etc., to be separated from the crop as the crop is conveyed over the screen to the auger for thrashing.

Figure 4:
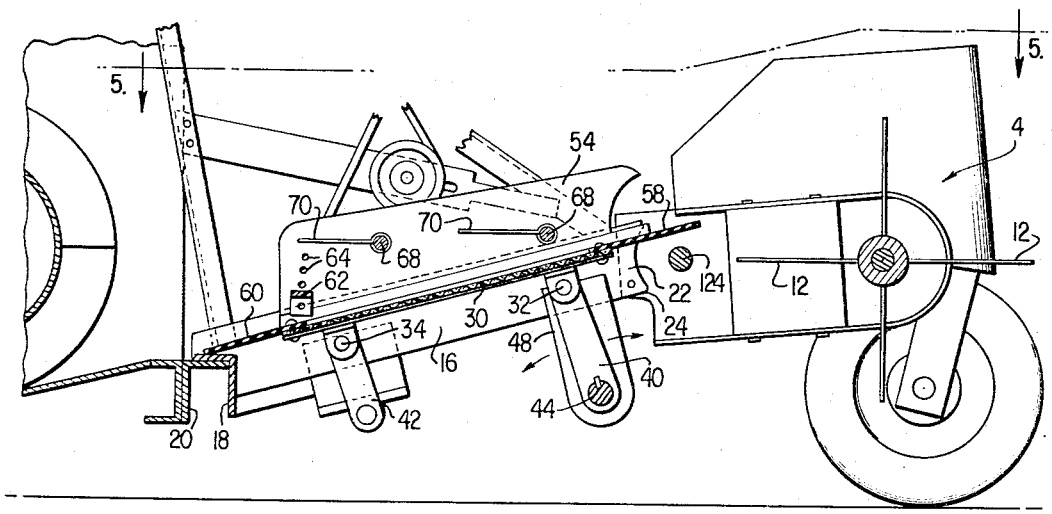
FIG. 4 is a longitudinal cross-sectional view of the combine as viewed in FIG. 3.

Referring to FIGS. 4, 6 and 7, this mounting of screen 30 in the illustrated embodiment is achieved by two pairs of L-shaped brackets, one pair of brackets 32 being bolted at opposite sides of the bottom of the screen at the front end thereof and the other pair of brackets 34 at corresponding positions at the rear end of the screen. Each pair of brackets 32 and 34 is provided with transversely aligned mounting holes which pivotally receive pins 36 and 38 fixed to levers 40 and 42 respectively. Levers 40 are keyed to a drive shaft 44 to be oscillated thereby (as will be subsequently described in greater detail) while levers 42 are rotatably mounted on suitable bearings 46. Drive shaft 44 is journalled for rotation in plates 48 which are fixed to frame side walls 16 and depend therefrom as best shown in FIG. 6. Bearings 46 are fixed at the bottom of plates 50 which depend from frame side walls 16 to which they are fixed as best shown in FIG. 7.

Vibration of screen 30 in some instances will cause beans to be deshelled and drop on the screen, but the mesh size of the screen will be sufficiently small so the beans will not fall through the screen.

In order to contain beans on the screen against movement off the sides of the screen, a pair of side walls 54 formed of any suitable material such as metal or hard rubber, are provided on the opposite sides of screen 30 to project upwardly above the plane of the screen. In the shown embodiment, screen side walls 54 each have an inwardly extending flange 56 at its lower edge which flange 56 rests on brackets 32 and 34 below screen 30 where it is secured by the same bolts 33 which secure the screen. Loss of deshelled beans at the opposite ends of screen 30 is prevented by rectangular extension members 58 and 60 formed of a suitable material such as sheet metal or hard rubber, which are fixed at the opposite screen ends to project beyond the latter at the same angle as the frame. Front extension member 58 is received under the discharge end of pick-up mechanism 4 while opposite rear extension member 60 engages on top of frame cross-piece 18 as shown in FIGS. 4 and 5.

Rocks which are collected on screen 30 are prevented from rolling downwardly into auger 8 by a cross-bar 62 mounted in screen sidewalls 54 at the discharge end of the screen as shown in FIGS. 4 and 5. In the specific embodiment, this mounting of cross-bar 62 is accomplished by a series of vertically spaced apertures 64 formed in each side wall 54 to receive end projections of cross-bar 62. In this manner, the vertical position of cross-bar 62 may be adjusted to prevent rocks of a certain size from entering auger 8.

In order to hold the windrow above screen 30 in loose or fluffed condition as it passes over screen 30, two or more cross members, shown as rods 68 are suitably fixed transversely above the screen in side walls 54 as best shown in FIGS. 4 and 5. Projecting laterally from rods 68 towards the combine header are a plurality of spring fingers 70 which are provided in pairs inter-connected by a coil 72 surrounding rod 68. Spring fingers 70 serve to hold the harvested crop above screen 30 while permitting rocks and clods of dirt to fall downwardly onto the screen.

In the preferred embodiment, a reel 80 is provided above the shaker mechanism to aid in the advancement of the windrow across the shaker mechanism in cases, for example, where the windrows are small in size, dis-continuous or heavily mixed with bulky weeds or grasses. Reel 80 is of the conventional type including a plurality of angularly spaced transversely extending vanes 82 from which project spring fingers 84 which engage the windrow to advance the same in the usual manner upon rotation of the reel. Reel vanes 80 are pivotally connected to radial supports 86 which are inter-connected by cordial struts 88. Inner ends of radial supports 86 are fixed to hubs 90 which receive a shaft 92 that is mounted for rotation in suitable journals 94. Supporting journals 94 in the proper position above shaker screen 30 are a pair of tubular metallic channels 96 which extend diagonally from support rails 98 on opposite sides of the shaker mechanism. Support rails 98 are fixed at one end to the combine header 9 and are bent downwardly at the opposite end where they are fixed to frame side walls 16 of the shaker mechanism. Completing the support structure is a pair of vertical struts 99 connected at one end to diagonal channels 96 and at the other end to support rails 98 as shown in FIGS. 1 and 3.

Figure 2:
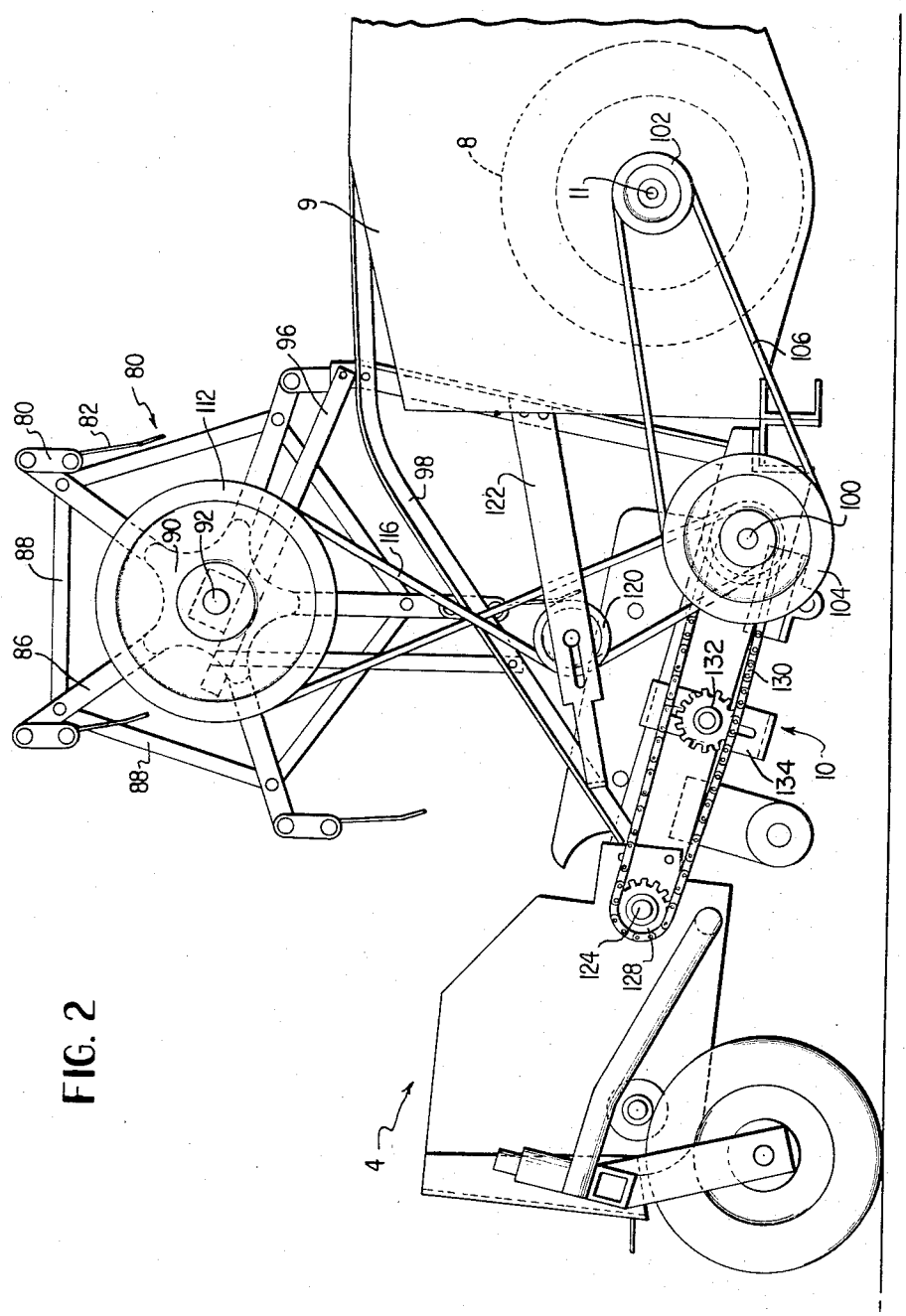
FIG. 2 is a side elevational view of the combine shown in FIG. 1.

Actuation of shaker screen 30 and reel 80 may be provided in any suitable manner which in the shown embodiment stems from the drive shaft 11 of auger 8, the latter being driven by a conventional power source. Referring to FIGS. 2 and 5, auger drive shaft 11 is connected to a stub shaft 100 to drive the same by means of pulleys 102 and 104 and inter-connecting belt 106. Stub shaft 100 is supported for rotation in flanges 108 which project laterally from frame front piece 18 as best shown in FIG. 5. Rotation of stub shaft 100 is transmitted to a drive pulley 112 on reel shaft 92 to drive the same by means of a pulley 114 on stub shaft 100 connected to reel pulley 112 by a belt 116. If desired, a guide pulley 120 for belt 116 may be mounted such as to support 122 fixed to header 9 and projecting rearwardly as shown in FIG. 2. Guide pulley 120 as shown may be adjusted to vary the tension in belt 116.

Rotation of stub shaft 100 is also transmitted to shaft 124 transversely mounted in the discharge end of pick-up mechanism 4 by means of pulleys 126 and 128 respectively fixed to shafts 100 and 124 and inter-connected by a belt 130. If desired, a guide pulley 132 may be provided for belt 130, which guide pulley 132 is shown as being adjustably mounted to bracket 134 that is fixed to frame side walls 16. Referring to FIGS. 3 and 5, shaft 124 in the pick-up mechanism extends to the opposite side thereof where it is rotatably connected to drive shaft 136 (which rotates pick-up fingers 112) by means of the belt and pulley arrangement generally designated 138.

Figure 3:
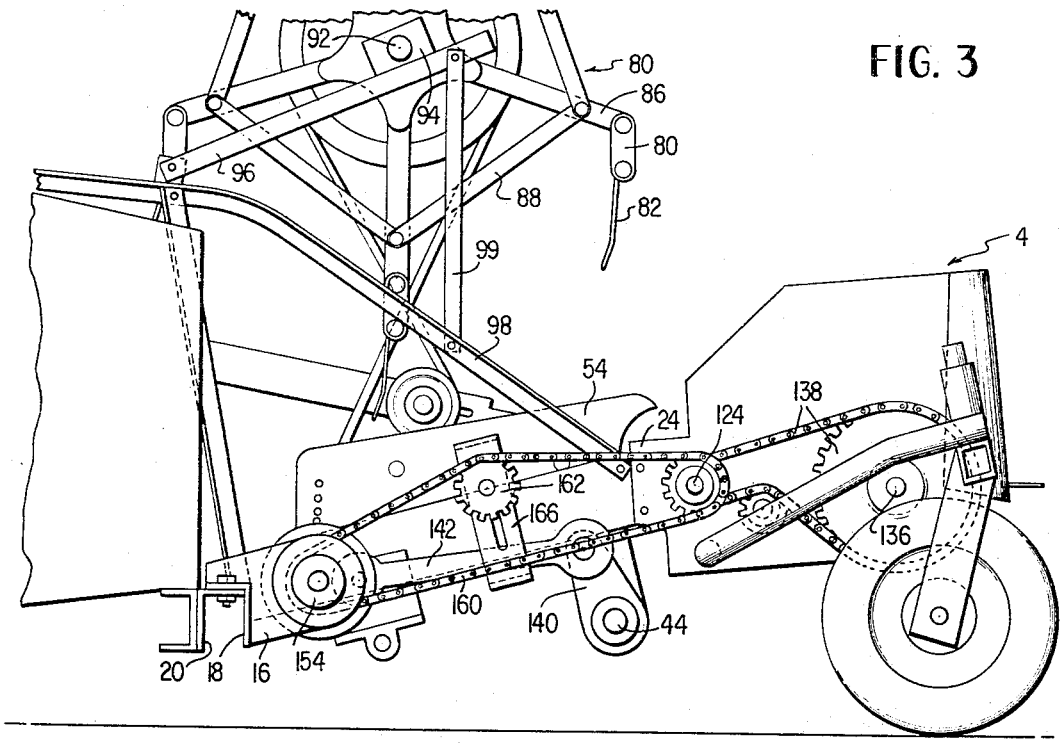
FIG. 3 is a view similar to FIG. 2 but taken from the opposite side of the combine.

Referring to FIGS. 1, 3 and 5, oscillating shaft 44 which, through levers 40, drives screen 30 in vibration is actuated by means of a swing lever 140 having one end fixed to oscillating shaft 44 and the other end pivotally connected to one end of a link 142. Opposite end of link 142 receives a pin 146 of a crank which is keyed to stub shaft 150 to be driven thereby. Such shaft 150 is supported for rotation in flanges 152 which extend laterally from frame cross-piece 18 and is driven by a pulley 154 mounted on shaft 150 and connected to a pulley 156 mounted on shaft 124 (in the discharge end of pick-up mechanism 4) by a belt 160. In the preferred embodiment, a guide pulley 162 is provided for belt 160; guide pulley 162 being rotatably mounted on a wall of a hollow bracket 166 which is fixed to frame side wall 16 and receives link 142 as shown in FIG. 5.

Operation of the combine will be apparent from the above description taken in conjunction with the following explanation: assuming that the thrashing mechanism is energized and the auger is rotating and thus driving the pick-up mechanism 4, reel 80 and shaker screen 30; as the pick-up mechanism passes over a window of beans, for example, fingers 12 will pick up the windrow and deposit the same rearwardly above shaker screen 30 where spring fingers 70 will hold the windrow in a loose and fluffed condition spaced from screen 30. Vibration of screen 30 together with the rods 68 and their spring fingers 70 will shake rocks, clods of dirt, etc., from the windrow and the latter will fall downwardly onto screen 30. This shaking action of the screen further serves to decrease the foliage of the windrow to thus lessen the load in the thrashing mechanism. Fine sand or dirt shaken from the windrow will pass through the screen while rocks and large clods of dirt will remain on the screen; however, clods of dirt, as a result of the vibration of the screen will be disintegrated and finally pass through the screen. Beans which might be separated from the windrow will be deposited on screen 30 and conveyed to auger 8 by the vibratory action of the screen as well as the downward slant of the screen towards the auger. Rocks, however, will be prevented from passing into auger 8 by means of cross bar 62 and the size of such rocks is governed by the particular vertical position of cross bar 62 which may be adjusted as described above.

Advancement of the windrow from above screen 30 into auger 8 is accomplished by the succeeding windrow placed on the screen by the pick-up mechanism and additionally in the preferred embodiment by reel 80 which is rotating clockwise (as viewed in FIG. 3) into engagement with the windrow. Rocks that are contained on the screen may be removed as desired by the operator.

From the foregoing, it will be seen that the present invention provides a highly effective and practical solution to a problem that has plagued farmers over the years.

As will be apparent to persons skilled in the art, various modifications and adaptations of the structure above described will become readily apparent without departure from the spirit and scope of the invention which is defined in the appended claims.

What is claimed is:

1. In a combine including a pick-up mechanism for gathering crop from a field and a thrashing mechanism situated rearwardly of the pick-up mechanism; a shaker mechanism positioned between said pickup mechanism and said thrashing mechanism including a screen positioned to transversely underlie harvested crop as it is conveyed from the pickup mechanism to the thrashing mechanism, means supporting said screen to incline downwardly at an oblique angle from the pickup mechanism to the thrashing mechanism to thereby facilitate conveyence of the crops to the thrashing mechanism by the pushing action of a new crop deposited on the screen by the pick-up mechanism, means for vibrating the screen for separating rocks and direct from the crop as the crop is conveyed from the pickup mechanism to the thrashing mechanism, reel means mounted for rotation above said screen for advancing crop from said screen to said thrashing mechanism, and a plurality of cross members extending transversely above said screen in spaced relationship with said screen, each cross member having a plurality of resilient fingers projecting generally laterally therefrom for holding crop above the screen while permitting rocks and dirt to fall from the crop onto said screen, said reel means being mounted above said cross members.

2. The combine as defined in claim 1 wherein said shaker mechanism includes an adjustable cross-bar extending transversely over said screen at the end thereof adjacent the thrashing mechanism for preventing rocks of a certain size to be conveyed to said thrashing mechanism from said screen.

3. In a combine having a pick-up mechanism for gathering crop from a field and a thrashing mechanism situated rearwardly of the pick-up mechanism; a shaker mechanism positioned between said pick-up mechanism and said thrashing mechanism for separating rocks and dirt from crop as the crop is being conveyed to the thrashing mechanism, said shaker mechanism including a screen positioned to underlie harvested crop as it is conveyed from said pick-up mechanism to said thrashing mechanism, at least two cross members extending transversely above said screen having a plurality of resilient fingers projecting generally laterally therefrom, and means for vibrating the screen; and a reel mounted for rotation above said screen and above and between said cross members for advancing crop from said screen to said thrashing mechanism.

4. For use with a combine for harvesting and thrashing beans and the like, a shaker mechanism for separating rocks and dirt from the harvested beans prior to thrashing, the mechanism comprising a frame, a screen, means mounting the screen with respect to the frame in a generally horizontal position for vibrating movement, a pair of side walls extending upwardly from opposite sides of the screen, a number of cross members extending above said screen and having opposite ends mounted in said side walls, a plurality of spring-like fingers extending laterally from said cross members for supporting harvested beans spaced above said screen, and means for vibrating said screen together with said cross-members for shaking rocks and clods of dirt from harvested beans above the screen and reel means rotatably mounted above said screen and said fingers for advancing harvested beans across said screen and fingers.

5. The shaker mechanism as defined in claim 4 further including a horizontal cross bar positioned transversely over one end of the screen for limiting the size of rocks which can pass beyond said one end of the screen.

6. The shaker mechanism as defined in claim 5 wherein said side walls each having a plurality of vertically spaced apertures in the side walls and said cross bar has opposite ends mounted in a pair of said apertures.

7. The shaker mechanism as defined in claim 4 further including planar extensions fixed to opposite ends of the screen respectively and projecting outwardly beyond the ends of said screen.

8. In a combine including a pick-up mechanism for gathering crop from a field and a thrashing mechanism situated rearwardly of the pick-up mechanism; a shaker mechanism located between said pick-up and thrashing mechanism including a screen positioned to underlie harvested crop as it is conveyed from the pick-up mechanism to the thrashing mechanism, support means above the screen and connected to the screen for holding harvested crop in spaced relationship to said screen but permitting rocks and dirt to fall from the crop to the screen, means for vibrating said screen together with said means, reel means rotatably mounted above said screen and above said support means for advancing crop across said screen and said support means to the thrashing mechanism, and means at the end of the screen closest to said thrashing mechanism for preventing rocks of a certain size to pass from said end of the screen into the thrashing mechanism.

9. For use with a combine for harvesting and thrashing beans and the like; the combination including a pick-up mcehanism for gathering crop from a field, a shaker mechanism positioned rearwardly of the pick-up mechanism for separating rocks and dirt from the crop gathered by the pick-up mechanism prior to delivery to the thrashing means of a combine, said shaker mechanism including a frame, a screen, means mounting the screen with respect to the frame in generally horizontal position for vibrating movement but with the screen inclined downwardly from the pick-up mechanism to the lower end of the screen positioned opposite the pick-up mechanism for facilitating conveyance of the crops across the screen to the combine, a pair of side walls extending upwardly from the opposite sides of the screen, a number of cross members extending above said screen and having opposite ends mounted in said side walls, a plurality of spring-like fingers extending laterally from said cross members for supporting gathered crop spaced above said screen, means for vibrating said screen together with said cross members for shaking rocks and clods of dirt from the harvested crop above the screen, and means at the lower end of the screen for preventing rocks of a certain size to pass from the lower end of the screen into the thrashing mechanism of an associated combine.

10. The combination defined in claim 9 further including reel means rotatably mounted above said screen and above said cross members for advancing crop from the pick-up mechanism across the screen to the lower end of the screen for deposit in the thrashing mechanism of an associated combine, and wherein said last recited means includes a horizontal cross member positioned transversely over the lower end of the screen with the opposite ends of the cross member mounted in said side walls.

References Cited

UNITED STATES PATENTS

| | | | |
|---|---|---|---|
| 2,481,652 | 9/1949 | Fort | 56—126 |
| 2,528,689 | 11/1950 | Flynt | 171—132 |
| 3,162,003 | 12/1964 | Schapansky | 171—132 |

ANTONIO F. GUIDA, *Primary Examiner.*

ABRAHAM G. STONE, *Examiner.*

P. A. RAZZANO, *Assistant Examiner.*